United States Patent [19]
Vanderhoof

[11] 3,791,518
[45] Feb. 12, 1974

[54] SIDE TRANSFER SORTING CONVEYOR
[75] Inventor: Frank B. Vanderhoof, Lake Forest, N.J.
[73] Assignee: Metramatic Corp., Landing, N.J.
[22] Filed: Apr. 27, 1973
[21] Appl. No.: 355,000

[52] U.S. Cl............................ 209/74 R, 198/31 AB
[51] Int. Cl............................................... B07c 3/06
[58] Field of Search........... 209/73, 74 R, 82, 111.7; 198/31 R, 31 AA, 31 AB

[56] References Cited
UNITED STATES PATENTS
3,009,572   11/1961   Seaborn...................... 198/31 AC X
3,735,867   5/1973   Vanderhoof................ 198/31 AB X Primary Examiner—Richard A. Schacher

[57] ABSTRACT

A sorting conveyor having a plurality of movable plaques on one conveyor base arranged to sort merchandise or similar articles carried on another conveyor positioned at one side of the sorting conveyor. The separation of articles may be controlled by some particular property of the articles such as weight, size, or color, sensed in a known manner. The plaques on the sorting conveyor are activated to engage the articles carried by the adjoining conveyor and change their relative position so that a series of fences can direct the reoriented articles into predetermined paths.

8 Claims, 6 Drawing Figures

PATENTED FEB 12 1974 3,791,518

SIDE TRANSFER SORTING CONVEYOR

RELATED PATENTS

The invention described herein is of the same general class as the sorting conveyors shown and described in U.S. Pat. Nos. 3,190,432, issued June 22, 1965 and 3,511,357, issued May 12, 1970. The foregoing patents are incorporated by reference herein in their entirety.

BACKGROUND OF THE INVENTION

This invention relates generally to sorting conveyors of the type using carrier bases which slide on transverse rods and support the articles to be sorted into classes. The patents listed above describe sorters which received all the articles from an input source which is generally another conveyor. After the sorting action, the various classes of articles are again transferred to a third conveyor which carries the articles to another station. The present invention eliminates the need for these two transfers and sorts the articles while on their original conveyor. Movable plaques are caused to extend over the edge of the conveyor and engage articles on an adjacent conveyor, pushing them transversely on the conveyor surface to designated positions where they may be collected into classes.

The invention comprises a sorting conveyor comprising a plurality of transverse rods, secured at their ends to endless chains and supporting plaques which can be moved along the transverse rods. Power means move the chains to direct the rods and bars through an upper operating plane where the bars and their plaques may be displaced to provide a sorting operation. On the return trip the rods are moved through a lower plane and the plaques are returned to their original positions. A plurality of cams are arranged just under the upper plane of the rods to engage vertical cam followers (one on each plaque) to move the plaques to their sorting position. Gates at the head of the cams are operated by the sensing means to control the sorting action. Two types of sorters are shown, one which moves articles to selected positions on a second conveyor so that they may be grouped in classes at the end of the conveyor. A second type includes a sorter action where selected class articles are moved to selected positions along the length of the conveyor so that they may be grouped in classes by fences which move the articles off the edge of the conveyor.

Other details of the invention will be disclosed in the following description, taken in connection with the accompanying drawings.

DESCRIPTION OF THE PREFERRED EMBODIMENT

Figure 5:
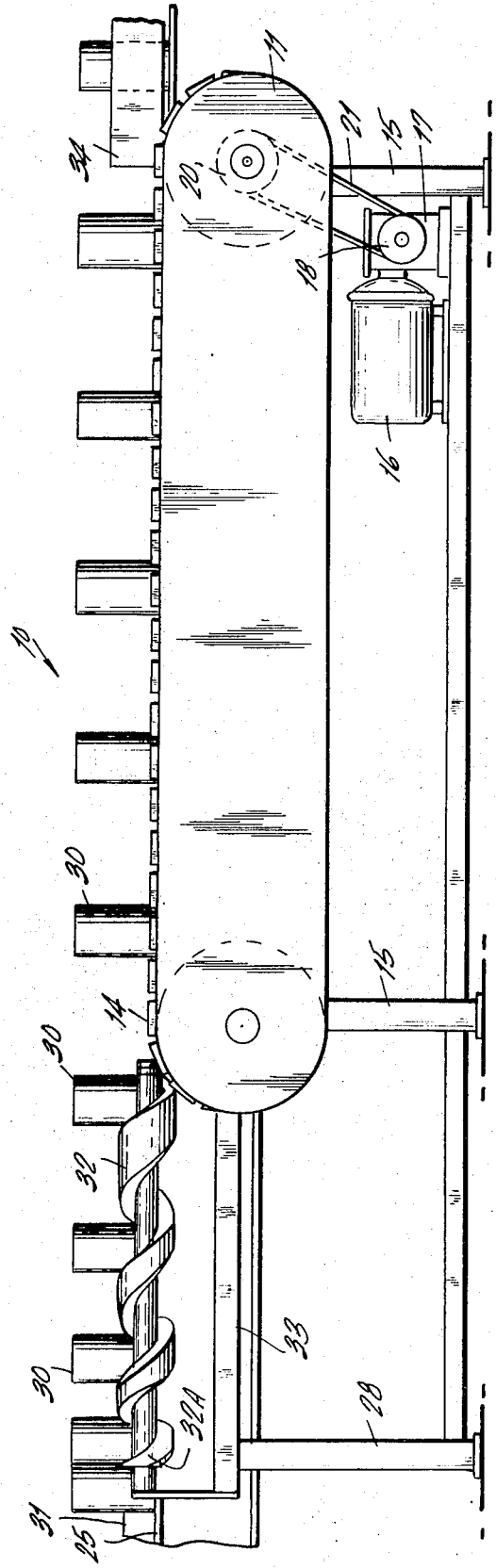
FIG. 5 is a side view of the two conveyors shown in FIG. 1.
Figure 6:
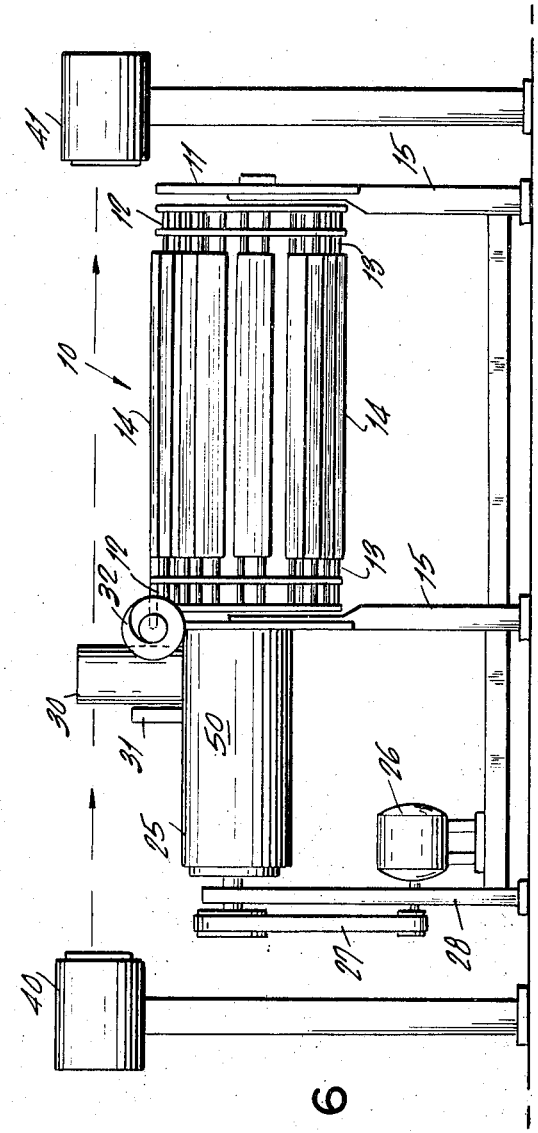
FIG. 6 is an end view of the two conveyors showing the positions of the photoelectric sensing means.

Referring now to the figures, a sorting conveyor 10 according to the present invention, includes side supporting plates 11, a pair of endless chains 12, and a plurality of transversely mounted rods 13 carried by the chains. The rods 13 support plaques 14. As shown in FIGS. 5 and 6, the conveyor 10 is supported by legs 15 and the chains 12 are moved by a motor 16 connected to a gear box 17 which in turn drives pulleys 18 and 20 and a belt 21. These components are similar to those shown in the patents listed above.

Figures 1, 2:
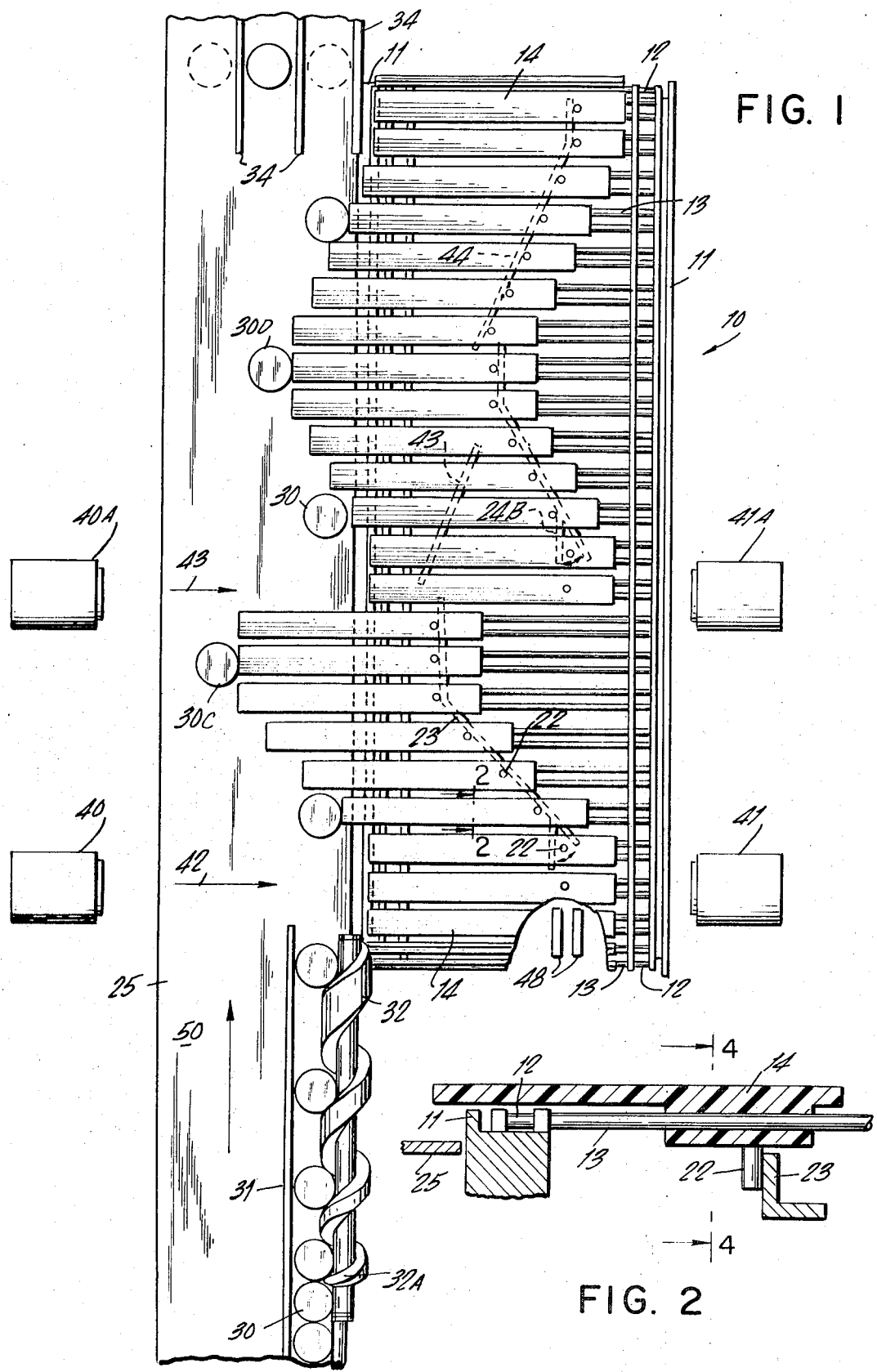
FIG. 1 is a plan view of the sorter-conveyor showing articles arranged in three rows by the movable plaques.
FIG. 2 is a cross sectional view of one of the supporting rods, a plaque, a cam follower, and a cam taken on line 2—2 in FIG. 1.
Figure 4:
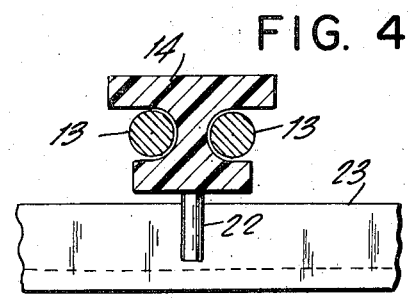
FIG. 4 is a cross sectional view (to an enlarged scale) of a plaque on two rods taken on line 4—4 in FIG. 2.

FIGS. 2 and 4 show the details of the plaques 14 which slide on the rods 13. A cam follower 22 is mounted at the bottom of each plaque. The cam follower 22 comprises a cylindrical metal stud extending downwardly in the path of a linear cam 23. The leading edge of some of the cams 23 as shown in FIG. 1, are connected to a gate switching means 24a or 24b controlled by a sensing device to either engage a passing cam follower 22 or permit it to pass by without disturbing the cam follower and the plaque direction.

A second article conveyor 25 is mounted adjacent to the sorting conveyor 10 and includes a flat endless belt 50 formed of a strip of fabric, hinged metal plates or the like. This conveyor 25 is run by a second motor 26 coupled to the belt 50 by means of a flexible band 27 and two pulleys. The second conveyor 25 is supported by legs 29, portions of the conveyor being secured to legs 15 of the sorting conveyor 10. The second conveyor 25 is disposed parallel with the sorting conveyor and may extend for a considerable distance before and beyond the sorting conveyor 10.

Articles to be sorted, indicated at 30 are moved along the second conveyor and adjacent the side of the sorting conveyor in a single line, along a limiter fence 31 and initially in contact with each other. For sorting by the sorting conveyor 10, the articles 30 must be separated a definite distance. A helical screw 32 with an initial sharp entering wedge 32a is employed for this separation. The thread spacing or pitch of the screw is thereafter increased until the final separation equals the desired article spacing. The helical screw 32 is journalled within a bracket 33 and is driven by motor 26 so that it always turns at a speed related to the moving conveyor belt 50.

As shown in the three row embodiment of FIG. 1, the articles 30 are sorted by being moved a maximum distance, an intermediate distance, or by leaving the articles in the same row in which they left the screw 32. Three channels formed by fences 34 guide the articles moved to these positions and transfer them to other areas where they may be processed or packed for shipment.

Figure 3:
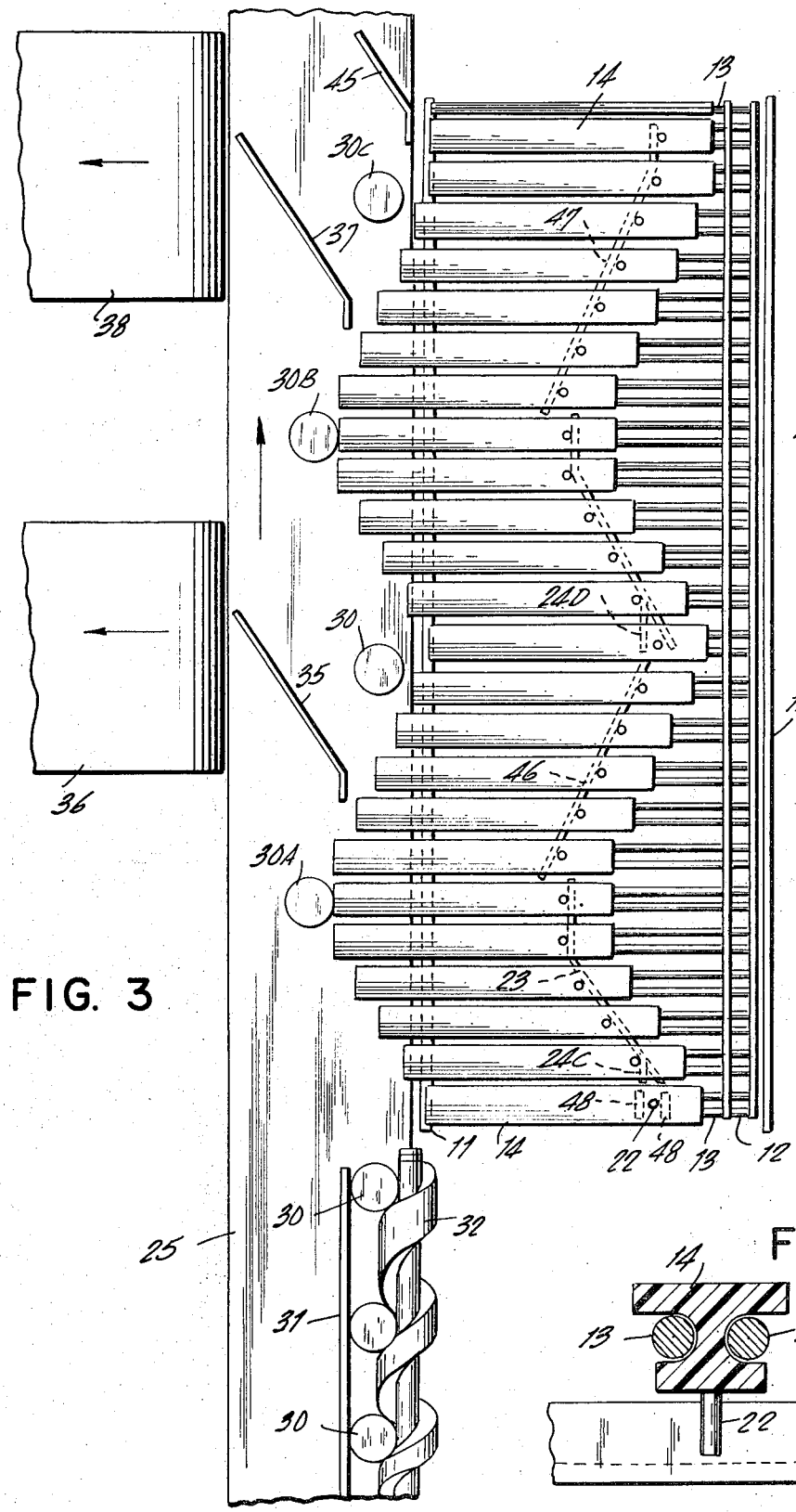
FIG. 3 is a plan view of the sorter-conveyor arranged to push articles to a collecting position where fences can move them to other conveyors adjacent the outer edge of the second conveyor.

FIG. 3 shows an alternate form of the present invention where the articles 30 are either left in their original position on the belt 50 or moved laterally to a position 30a where they may be collected by a first fence 35 and moved to an additional conveyor 36 angularly disposed with respect to the belt 50. Some articles may have their sorting transfer delayed until they have been carried beyond fence 35. Then they are moved to the sorting position 30b, collected by fence 37, and moved to another output conveyor 38. It is obvious that additional sorting means can be provided by extending the length of the sorting conveyor and increasing the number of sorting areas and fences.

The sensing means 40, 40a, which determine the action of gates 24 are shown in FIGS. 1 and 6 and may be of conventional construction, well-known in the art. In FIG. 1, the sensing means 40 may include a source of light and a directive optical system which shines a light beam across the conveyors 10, 25 and into housing 41, within which there is a photoconductive cell and wiring means to control a solenoid coupled to gate switching means 24a. Details of such a system are well-known in the art and are shown in U.S. Pat. No. 3,511,357. A second sensing arrangement 40a similar to the first is positioned adjacent to the second gate 24b and includes a light source directed at a photoconductive cell within a housing 41a. Similar devices can be applied to the conveyor 10 shown in FIG. 3.

The operation of these sorting arrangements will be evident from the above description. In the embodiment shown in FIG. 1, the articles 30 are spaced by screw 32, and moved to a first sensing position indicated by arrow 42. Current from the photoconductive cell within housing 41 determines whether gate 24a will remain in its inactivated position and pass cam followers and plaques 14 to the left under the control of linear cam 23. If the gate 24a is activated the plaque 14 will move beyond the edge of the sorter conveyor and push the adjoining article 30 to the position 30c. The cam followers 23 are then engaged by a first return cam 43 and moved part-way back to their original position. Continued motion of the conveyor 10 moves the plaques and their cam followers 22 to a position where they are engaged by a second return cam 44 and pushed back to their original or starting position. If the first sensing means is not activated but the second one is, gate 24b is swung to catch cam followers 22 and the article carried along on belt 50 is moved to an intermediate position 30d so that the movement of the second conveyor belt will direct it between fences 34. Finally return cam 44 pulls these plaques back to their starting position.

The operation of the sorting device shown in FIG. 3 is similar to the device shown in FIG. 1 except that all selected articles are moved the same lateral distance from their original orientation. Operation of gate 24c intercepts cam followers 22 and the plaques 14 move the adjoining article 30a to a position where it will be caught by fence 35. In a similar manner, operation of gate 24d moves the associated plaques 14 to move article 30b to a position where it will be caught by fence 37.

All rejects 30c are permitted to move along the conveyor 25 without any transverse movement to be caught by the end fence 45. Return cams 46 and 47 move the cam followers 22 and the plaques 14 to their starting position after each sorting action.

The spacing screw 32 with the variable thread is preferred since it adjusts the article spacing without shock or vibration. However, a simple gate using an open and close escapement could be used instead without changing the other components of the invention.

It should be noted that the plaques 14 are normalized before leaving the upper plane of the sorter conveyor. This is necessary in order to move the ends of the bars away from a conflicting position with the fences 34 and the rest of the second conveyor belt 50. There is no real need for a lower cam to move the bars but to keep them in place, a double cam 48 engages the cam followers on their return trip and places the plaques in the desired position just before reaching the 24a gate (FIG. 1) or the 24c gate.

In order to prevent undue motion of the articles which might cause damage or spillage where liquid containers are being sorted, (FIG. 3), both conveyors 10 and 25 are moved at the same speed.

While the example given employs a simple light beam to control the plaques, it will be apparent to those skilled in the art that the color of the articles 30 or their weight may be used for this purpose by employing light filters or weighing devices as sensors.

Having thus fully described the invention, what is claimed as new and desired to be secured by Letters Patent of the United States is:

1. A side transfer or side push sorting-conveyor for directing articles into a plurality of paths while they are being carried by a conveyor comprising:
   a. A conveyor for moving the articles to be sorted,
   b. means for spacing the articles a predetermined distance from each other;
   c. a sorting conveyor parallel to and in side-by-side relationship with the article conveyor;
   d. a plurality of transverse rods on said sorting conveyor,
   e. power means coupled to the transverse rods to drive the said rods in a plane parallel to the plane of the article conveyor.
   f. a plurality of plaques slidably mounted on said rods and including a cam follower on each bar for positioning the bars along the rods;
   g. a linear cam for engaging the cam followers and for laterally moving the plaques into contact with articles on the belt conveyor whereby certain of the articles are slid to a sorted position,
   h. a rockable gate at the entrance end of the cam;
   i. and a sensing means for determining the class of an article, said sensing means coupled to said gate for operating it to either engage or disengage said cam followers.

2. A conveyor device according to claim 1 wherein the spacing means includes a rotating screw for engaging the articles between successive convolutions and separating them a predetermined distance.

3. A conveyor device according to claim 1 wherein the transverse rods have their ends secured to a link chain.

4. A conveyor device according to claim 1 wherein the cam follower extends downwardly from the lower surface of the plaque.

5. A conveyor device according to claim 1 wherein the sensing means includes a beam of light and a photosensitive cell for separating the articles into classes having different linear dimensions.

6. A conveyor device according to claim 1 wherein the articles in the sorted paths are collected by a series of fences also arranged along the length of the sorting conveyor.

7. A conveyor device according to claim 1 wherein a plurality of linear cams are mounted under the transverse rods and cause the plaques to push articles into a plurality of paths on the sorting conveyor.

8. A conveyor device according to claim 1 wherein a plurality of return linear cams are arranged under the transverse rods to return the plaques to their original retracted positions.

* * * * *